United States Patent [19]

Kaps

[11] Patent Number: 4,765,561
[45] Date of Patent: Aug. 23, 1988

[54] DRIVE-OUT ASSEMBLY FOR MICROFILM APPARATUS

[75] Inventor: Wolfgang Kaps, Kaarst, Fed. Rep. of Germany

[73] Assignee: Minnesota Mining and Manufacturing Company, St. Paul, Minn.

[21] Appl. No.: 43,354

[22] Filed: Apr. 28, 1987

[30] Foreign Application Priority Data

May 9, 1986 [DE] Fed. Rep. of Germany ....... 3615703

[51] Int. Cl.⁴ ............................................. G11B 15/32
[52] U.S. Cl. ..................... 242/192; 242/195
[58] Field of Search .......... 242/179, 192, 195, 67.1 R, 242/67.3 R, 71.1

[56] References Cited

U.S. PATENT DOCUMENTS

| | | | |
|---|---|---|---|
| 3,627,230 | 12/1971 | Wangerin | 242/195 X |
| 3,733,036 | 5/1973 | Eitzenberger | 242/192 |
| 3,885,756 | 5/1975 | Uehara et al. | 242/195 |
| 3,951,357 | 4/1976 | Yamada et al. | 242/195 |

Primary Examiner—David Werner
Attorney, Agent, or Firm—Donald M. Sell; David W. Anderson

[57] ABSTRACT

A drive-out assembly to thread a film wound on a reel or in a coil 2 includes an arm 7 to swing into the cartridge and engage the film with a drive-out roller 8 which drives the film in an unwinding direction to drive the free end over a stripper member 10 urged against the film. The drive for the drive-out roller 8 includes a first drive gear 20 which rotates a driven gear 23 through an intermediate gear 21 to drive a shaft 19 having a drive gear 23 to drive the drive-out roller 8 through other intermediate gears 24, 8'.

16 Claims, 2 Drawing Sheets 4,765,561

DRIVE-OUT ASSEMBLY FOR MICROFILM APPARATUS

BACKGROUND OF THE INVENTION

1. Field of the Invention

The invention relates to a drive-out assembly for a microfilm apparatus and in one aspect to an assembly for driving the free end of a coiled microfilm off a reel.

2. Description of the Prior Art

Presently, a variety of different microfilm cartridges are on the market; for this reason it has been common practice to use several drive-out assemblies each developed specifically for one type of microfilm cartridge.

It is the object of the present invention to provide a drive-out assembly for microfilm apparatus which is suited for different types of microfilm cartridges.

SUMMARY OF THE INVENTION

In a drive-out assembly for microfilm apparatus of the kind stated above, that object is achieved by a pivoting arm mounted to be pivotable between first and second positions and having mounted thereon a drive-out wheel. From the first position the drive-out wheel can enter the microfilm cartridge and engage the peripheral surface of microfilm coil. In this second position of pivoting arm the drive wheel is driven to move the free end of the microfilm to a stripper element disposed on pivoting arm. The free end can then be driven from microfilm cartridge by said stripper element and by a drive-out wheel The pivoting arm is then pivoted away from the area of microfilm cartridge to the first position.

An essential advantage of the inventive drive-out assembly is that it is suited for different microfilm cartridges which are being offered in the marketplace so that microfilm apparatus equipped with the inventive assembly may be used for a variety of different microfilm cartridges. As a result, the manufacturing of microfilm apparatus can be much simpler and less expensive.

Another advantage of the invention is that it enables the free end of the microfilm wound up in the cartridge to be driven out in a safe and rapid manner and to be fed automatically to a pair of guide rolls.

Advantageously, the inventive drive-out assembly is relatively simple in construction and adapted for easy automatic actuation.

BRIEF DESCRIPTION OF THE DRAWINGS

The invention and its embodiments will now be explained in detail under reference to the attached Figures, wherein.

DETAILED DESCRIPTION

Figure 1:
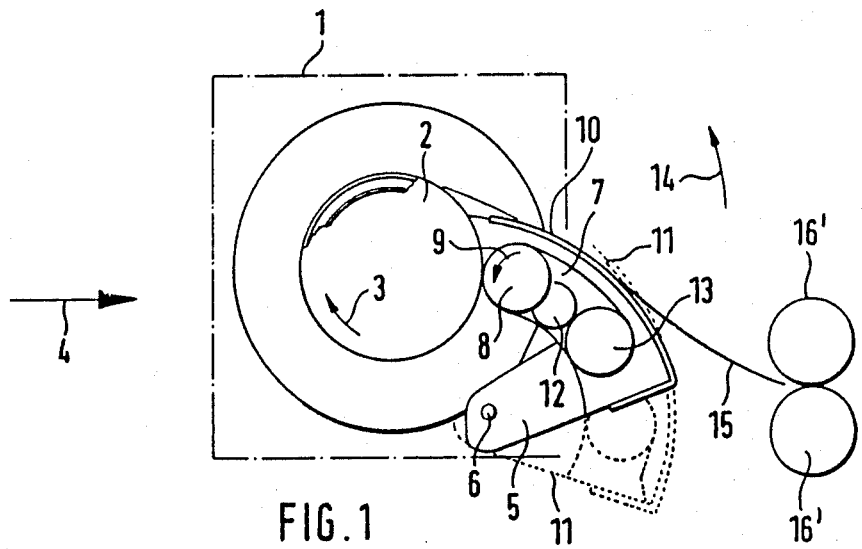
FIG. 1 is a schematic side view of a drive-out assembly according to the present invention.

In FIG. 1, reference numeral 1 designates a microfilm cartridge with a coil of microfilm on a reel 2 wound up therein. Conventionally, a microfilm cartridge 1 of this kind is introduced in the direction of arrow 4 in a receiving channel or passage or the like (not shown) of a microfilm apparatus so that drive means (also not shown), which may be a drive shaft disposed in the cartridge receiving passage, is aligned with cartridge 1. Such drive means may be made to engage the core of the microfilm reel upon which the microfilm 2 is wound to rotate the latter in the direction of arrow 3.

As shown in FIG. 1 the drive-out assembly substantially comprises a pivotable arm 5 mounted for pivotal movement about an axis of rotation 6 on a housing wall (not shown) or the like structure of the microfilm apparatus. A mounting plate 7 is secured on pivoting arm 5 and has mounted thereon a drive-out roll 8 for rotation in the direction of arrow 9. A stripper member 10 is mounted on pivoting arm 5 or on mounting plate 7.

Under reference to the simplified schematic view in FIG. 1, the function of the present drive-out assembly will now be explained in detail. Initially, a microfilm cartridge 1 is introduced in the direction of arrow 4 into the previously mentioned receiving and guiding passage of microfilm apparatus until the core of the microfilm reel is aligned with the drive means (not shown). In the process, the present drive-out means assumes the position indicated by dotted line 11, in which it is swung-preferably downwardly about axis 6—away from a position adjacent microfilm cartridge 1. In the next step, arm 5 is pivoted upwardly in the direction of arrow 14 about axis 6 until drive-out roll 8, which preferably is made of rubber or a soft synthetic material, enters a microfilm cartridge through an opening (which may be totally closed except for that opening or may be open on one side) until it engages the periphery of microfilm coil 2. In order to tauten loose layers of the microfilm coiled on the reel, the reel is rotated in a subsequent step against the direction of arrow 3 by the drive means engaging the core of the reel. Thereafter, a separate drive mechanism (not shown) activates the mechanism for driving drive-out roll 8. Drive-out roll 8 rotates in the direction of arrow 9 to drive the reel in the direction of arrow 3. Continued rotation of reel in the direction of arrow 3 causes the leading end of the film to reach the area of stripper member 10, which rests on the periphery of film coil 2. Stripper member 10 is mounted to have it's free end engage the periphery of film coil on reel 2 whenever the drive-out roll is urged against the periphery of reel 2 and passes from the free end of the stripper member 10 along the surface thereof and along a guide 15, which preferably is in the form of a sheet metal element, to a pair of feed rolls 16', 16' which are urged resiliently against each other, with one of said feed rolls being driven. As a result, feed rolls 16', 16' advance the leading edge of the microfilm as it enters the nip between feed rolls 16', 16'. After the pair of feed rolls 16', 16' has taken over the function of transporting the film, pivoting arm 5 is pivoted away from microfilm cartridge 1 toward the first position shown by phantom outline 11.

Figure 4:
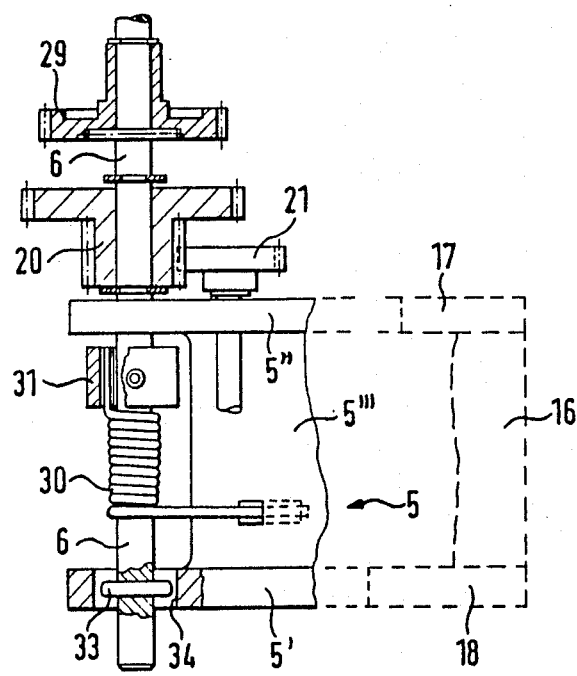
FIGS. 2 to 4 are detailed sectional views of a preferred embodiment of the inventive drive-out assembly.
Figure 3:
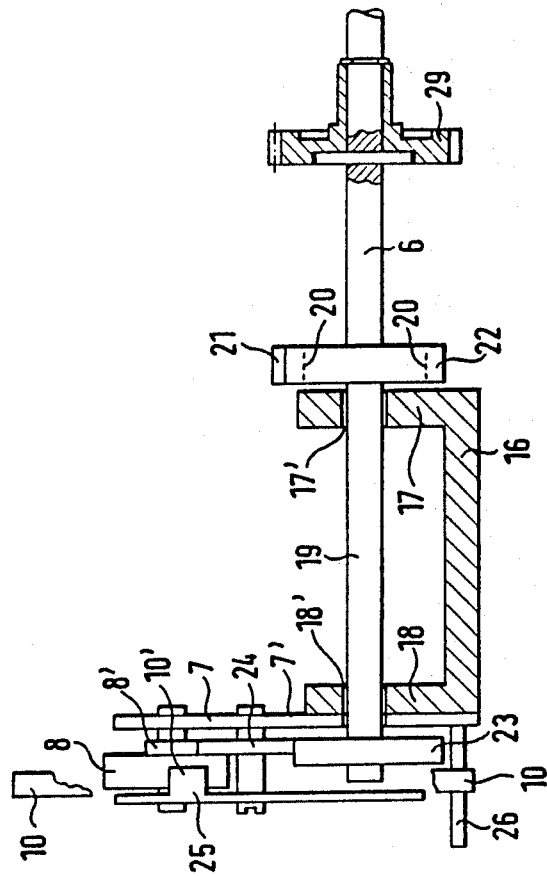
Figure 2:
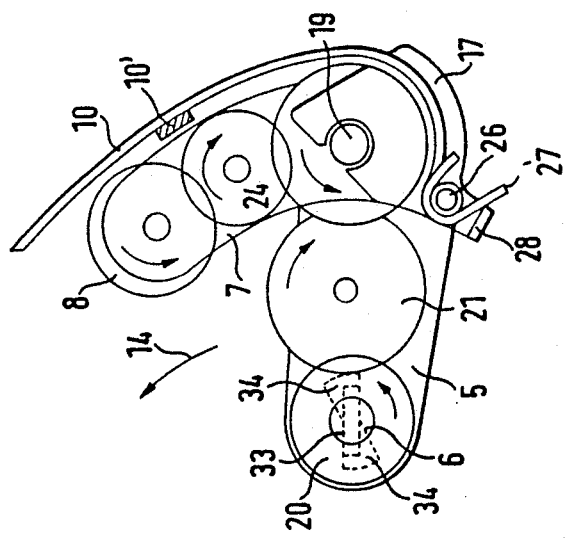

Reference will now be made to FIGS. 2 to 4 to explain in greater detail preferred embodiments of the inventive drive-out assembly.

Details of FIGS. 2 and 3 which have been explained in conjunction with FIG. 1 are designated by the same reference numerals. As evident particularly in FIG. 3, which shows a side view from the right of the assembly in FIG. 2, a substantially U-shaped holding element comprises a web portion 16, a first leg 17 and a second leg 18. Opposite openings 17', 18' in first leg 17 and second leg 18 respectively support a shaft 19 for rotation. Pivoting arm 5 is preferably formed integral with first leg 17 to extend substantially normally into the drawing plane of FIG. 3. In the manner shown in FIG. 2, drive shaft 6, which mounts pivoting arm 5 for rotation in direction of arrow 14, carries a drive wheel 20.

Wheel 20 preferably is a gear meshed with a gear 21 mounted for rotation on pivoting arm 5. Gear 21 in turn meshes with a gear 22 mounted on shaft 19 for rotation therewith.

In the manner shown in FIG. 3, another gear 23 is mounted on shaft 19 for rotation therewith and is coupled through another gear 24 to a gear 8' mounted on the shaft of drive roll 8 for rotation therewith; preferably, gear 8' is formed integral with drive roll 8 on one side thereof. Shaft 19 extends through an opening 7' in mounting plate 7 which is aligned and coextensive with the opening in second leg 18. In the manner shown in FIG. 3, gear 24 and drive roll 8 are mounted for rotation in mounting plate 7 in a manner such that gear 24 is aligned with drive roll 8, which preferably is formed integral with drive-out roll 8. In parallel with mounting plate 7 there is provided a holding plate 25 which preferably is screwed down on the end face of the pin mounting gear 24. To prevent rotation of plate 25, the end portion of the shank of the bearing pin common to gear 8' and drive-out roll 8 is introduced in a bore provided in the holding plate 25. Gears 23, 24 and drive roll 8 as well as gear 8' are located between holding plate 25 and mounting plate 7.

Mounting member 7 preferably is screwed down on second leg 18. it is contemplated alternatively to extend second leg 18 itself and to mount gear 24 and drive-out roll 8 with gear 8' on that extension directly.

On the side of mounting plate 7 facing away from second leg 18, there is secured below gear 23 a pin 26 to rotatably mount stripper member 10 in a manner to be explained in detail below.

Drive wheel 20 is loosely mounted for rotation on shaft 6, about which arm 5 is pivotable in the direction of arrow 14 (FIG. 2), and has rotary motion imparted thereto by drive means (not shown and described in detail) when drive-out roll 8 engages the outermost layer of film coil 2 after arm 5 has performed its pivoting movement. The rotation of drive wheel 20 so moved is transmitted by gear 21 to gear 22. Gear 22 is mounted on shaft 19 for rotation therewith; as a result, the aforesaid rotation is transmitted by shaft 19 to gear 23 which also is mounted on shaft 19 for rotation therewith and meshes with gear 24 mounted rotatably on mounting plate 7. Gear 24 transmits the rotation to drive roll 8 and to gear 8', which preferably is formed integral with drive roll 8.

It is contemplated and within the purview of the present invention to provide instead of gears 20, 21, 22, 23, 24 and 8', frictionally engaging wheel elements.

Referring now to FIG. 4, which shows a top plan view of the main shaft, a gear 29 is mounted on shaft 6 for rotation therewith, to be rotated by drive means, such as a worm gear not shown, to pivot arm 5 in the direction of arrow 14 of FIG. 2. Preferably, pivoting arm 5 is mounted on shaft 6 in a manner such as to be movable relatively thereto through a given angular range only. Conveniently, such limitation is obtained by an entrainment pin 33 extending through a diametrical throughbore provided in shaft 6 to engage an opening 34 in arm 5 which is defined preferably by radially extending abutment edges, such opening being shaped to permit the aforesaid movement of the shaft relative to pivoting arm 5. Preferably pivoting arm 5 also comprises U-shaped structure having legs 5', 5" mounted for rotation on shaft 6, with the rotation of one (5') of the legs preferably limited by the aforesaid entrainment pin 33. Transversely extending web 5''' supports one end of a spring element, which preferably comprises a torsion spring 30 surrounding shaft 6 between legs 5' and 5" and having its other end connected to shaft 6. Preferably, that other end of spring 30 engages a ring element 31 mounted for rotation and adapted to be fixed on shaft 6, as shown in FIG. 4. Rotary adjustment of ring 31 permits the setting of the bias which causes drive-out roll 8 to be urged down on film coil 2 when arm 5 is pivoted in the direction of arrow 14 to its second operative position. Stated in general, the force exerted by spring 30 acts in a manner to cause arm 5 to be pivoted relatively to shaft 6 towards the operative position thereof until entrainment pin 33 engages the corresponding abutment edge of opening 34. As drive roll 8 is pressed down on the peripheral surface of film coil 2 in that condition, pin 33 will leave the aforesaid abutment edge, and the force exerted by spring means 30 will resiliently urge pivoting arm 5 and drive-out roll 8 against the peripheral surface of film coil 2 so that drive-out roll 8 is urged resiliently against the periphery of film coil 2 even in case the latter is not perfectly circular.

Referring again to FIGS. 2 and 3, there will now be explained the arrangement and operation of stripper element 10. Stripper element 10 is in the form of an arcute sheet metal member having one of its ends coiled up to loosely surround pin 26. From that pin 26, stripper element 10 extends arcuately around gear 23 towards drive-out roll 8. Holding element 25 has thereon a tab 10' turned over to project towards takeup element 7 or leg 18. A spring 27 is provided to urge stripper element 10 against the aforesaid tab 10'. As shown in FIG. 2, the aforesaid spring preferably has one end resting against a projecting portion 28 of mounting plate 7 and the other end resting against striper element 10. The free end of stripper element 10 extends beyond the area of drive-out roll 8 in a manner such as to engage the peripheral surface of film coil 2 and to be raised from tab 10' against the force of spring 27 when drive-out roll 8 contacts film coil 2. As a result, spring 27 urges the free end thereof on the peripheral surface of film coil 2.

I claim:

1. A drive-out assembly for a microfilm coiled within a microfilm cartridge, said cartridge being adapted to be introduced in a cartridge receiving channel of a microfilm apparatus, said drive-out assembly comprising a pivoting arm mounted to be pivotable between a first position away from said microfilm cartridge and a second position about a first shaft, a mounting plate secured to or formed integral with said pivoting arm distally of said first shaft, a drive-out roll mounted for rotation on said mounting plate to engage the peripheral surface of said coiled microfilm in said second position of said pivoting arm and to move the free end of said microfilm to a stripper element disposed on said pivoting arm, said drive-out roll being driven by a second shaft disposed adjacent the juncture of said pivoting arm and said mounting plate, which second shaft supports for rotation therewith a first wheel and a second wheel, said first wheel being coupled to said drive-out roll by an intermediate wheel mounted for rotation on said mounting plate and by said second wheel coupled to a drive wheel through another intermediate wheel mounted for rotation on said pivoting arm.

2. An assembly according to claim 1, wherein said drive wheel, said another intermediate wheel and said second wheel comprise one of gears and frictionally interengaging wheels to transmit said rotational movement.

3. An assembly according to claim 1, wherein said first wheel and intermediate wheel comprise frictionally interengaging wheels.

4. An assembly according to claim 1, wherein said first wheel is mounted on said second shaft for rotation therewith and said intermediate wheel comprises gears, and by intermediate gear meshing with a gear mounted on the shaft of said drive-out roll said drive-out roll is rotated.

5. An assembly according to claim 4, wherein said gear being formed integral with drive-out roll on one major surface thereof.

6. An assembly according to claim 1 wherein said drive-out roll comprises a soft synthetic material.

7. An assembly according to claim 1, wherein said pivoting arm and said mounting plate are connected with each other in V-fashion so that said shaft is disposed at one free end of the "V", said drive-out roll is disposed at the other free end of the "V", and said second shaft is disposed at the juncture of the two legs of said "V".

8. An assembly according to claim 1 wherein spring means biases said pivoting arm about said shaft towards said second position and abutment means for limiting said movement of said pivoting arm.

9. An assembly according to claim 8, wherein said drive-out roll is adapted to be urged by said spring means against the peripheral surface of a said film coil in the second position of said drive-out roll in a manner such that said shaft is rotated selectively relative to said pivoting arm and away from said abutment means within a given angular range against the force of said spring means towards said second position.

10. An assembly according to claim 8, wherein said spring means comprising a torsion spring surrounding said shaft, said spring having one end secured on said pivoting arm and its other end secured to said shaft, by pivoting arm having in the area of said shaft an opening to engage an entrainment pin extending transversely of said shaft through a diametrical bore therein, and by said opening having first and second radially extending edges to define the limits of the aforesaid angular range, and by said torsion spring rotating said pivoting arm in a manner such that said entrainment pin engages the first radial abutment edge of opening when said drive-out roll is not urged against the peripheral surface of a said film coil.

11. An assembly according to claim 10, wherein one end of torsion spring is secured to said shaft engaging an adjustable ring adapted to be fixed in a plurality of positions to vary the circumferential bias for adjusting the position of said shaft.

12. An assembly according to claim 1 wherein a stripper element, in the form of a strip-shaped element having one end thereof mounted for rotation about said mounting plate forming part of said pivoting arm, having a free end urged against the surface of said film coil in a manner such that the free end of the film rotated in the drive-out direction will be raised from the periphery of the film coil and be driven out at the free end of said stripper element.

13. An assembly according to claim 12, wherein said strip-shaped element forming said stripper element is biased by spring means to resiliently urge its free end against the surface of a said film coil when said drive-out roll engages the periphery of said film coil.

14. An assembly according to claim 13, wherein a said free end of said film, after having been driven out, is guided across the surface of said stripper element to guide means for directing said free end to a pair of feed rolls.

15. An assembly according to claim 7, wherein a stripper element is mounted on said mounting plate, one end of stripper member being mounted adjacent the juncture of said "V" and by the body of the stripper member extending about the periphery of said first wheel, of said intermediate wheel and of said drive-out wheel in a spaced relationship to these wheels to a position to engage a said film coil.

16. A drive-out assembly for a microfilm coiled up in a microfilm cartridge, said cartridge being adapted to be introduced in the cartridge receiving channel of a microfilm apparatus, said assembly comprising a pivoting arm formed in a U-shape mounted to be pivotable between first and second position about a shaft extending through aligned bores in each of two legs of said U-shaped pivoting arm and having attached thereto a mounting plate supporting a second shaft at the juncture of said pivoting arm and said mounting plate and a drive-out wheel in a manner such as to enter microfilm cartridge and to engage the peripheral surface of a coil of said microfilm in the second position of said pivoting arm by said drive-out wheel, said drive-out wheel being driven by drive means including a wheel mounted on said second shaft to move the free end of the microfilm to a stripper element disposed on said pivoting arm to be directed from the microfilm cartridge by said stripper element, and said drive-out wheel being pivoted away from the area of microfilm cartridge to the first position thereof.

* * * * *